US010583631B2

(12) United States Patent
Kandasamy et al.

(10) Patent No.: US 10,583,631 B2
(45) Date of Patent: Mar. 10, 2020

(54) IN-SITU INTERLOCKING OF METALS USING ADDITIVE FRICTION STIR PROCESSING

(71) Applicant: Aeroprobe Corporation, Christiansburg, VA (US)

(72) Inventors: Kumar Kandasamy, Blacksburg, VA (US); Jeffrey Patrick Schultz, Blacksburg, VA (US)

(73) Assignee: MELD Manufacturing Corporation, Christiansburg, VA (US)

( * ) Notice: Subject to any disclaimer, the term of this patent is extended or adjusted under 35 U.S.C. 154(b) by 276 days.

(21) Appl. No.: 15/347,818

(22) Filed: Nov. 10, 2016

(65) Prior Publication Data
US 2017/0057204 A1    Mar. 2, 2017

Related U.S. Application Data

(60) Division of application No. 14/643,396, filed on Mar. 10, 2015, now Pat. No. 9,511,446, which is a (Continued)

(51) Int. Cl.
*B23K 20/12* (2006.01)
*B32B 15/01* (2006.01)
(Continued)

(52) U.S. Cl.
CPC .......... *B32B 15/01* (2013.01); *B23K 20/1205* (2013.01); *B23K 20/127* (2013.01); (Continued)

(58) Field of Classification Search
CPC .......... B23K 20/127; B32B 3/30; B32B 7/022
See application file for complete search history.

(56) References Cited

U.S. PATENT DOCUMENTS 1,610,945 A * 12/1926 Goldsmith .............. E05G 1/024
                                                       164/108
3,217,957 A    11/1965 Jarvie et al.
(Continued)

FOREIGN PATENT DOCUMENTS

CN    102120287    7/2013
CN    102120287 B    7/2013
(Continued)

OTHER PUBLICATIONS

Berbon et al., Friction stir processing: a tool to homogenize nanocomposite aluminum alloys, Scripta Materialia, vol. 44, No. 1, pp. 61-66, Jan. 5, 2001.
(Continued)

*Primary Examiner* — Adam Krupicka
(74) *Attorney, Agent, or Firm* — New River Valley IP Law, PC; Michele L. Mayberry

(57) ABSTRACT

A method for joining materials using additive friction stir techniques is provided. The method joins a material to a substrate, especially where the material to be joined and the substrate are dissimilar metals. One such method comprises (a) providing a substrate with one or more grooves; (b) rotating and translating an additive friction-stir tool relative to the substrate; (c) feeding a filler material through the additive friction-stir tool; and (d) depositing the filler material into the one or more grooves of the substrate. Translation and rotation of the tool causes heating and plastic deformation of the filler material, which flows into the grooves of the substrate resulting in an interlocking bond between the substrate and filler material. In embodiments, the depositing of the filler material causes deformation of the grooves in the substrate and an interlocking configuration between the grooves of the substrate and the filler material results.

29 Claims, 4 Drawing Sheets

Related U.S. Application Data continuation-in-part of application No. 14/573,430, filed on Dec. 17, 2014, now Pat. No. 9,266,191.

(51) Int. Cl.

| | | |
|---|---|---|
| *B23K 20/233* | (2006.01) | |
| *B23K 20/227* | (2006.01) | |
| *B33Y 10/00* | (2015.01) | |
| *B33Y 80/00* | (2015.01) | |
| *B32B 3/30* | (2006.01) | |
| *B32B 7/04* | (2019.01) | |
| *B23K 103/02* | (2006.01) | |
| *B23K 103/10* | (2006.01) | |
| *B23K 103/12* | (2006.01) | |
| *B23K 103/14* | (2006.01) | |
| *B23K 103/08* | (2006.01) | |
| *B23K 103/18* | (2006.01) | |
| *B23K 103/20* | (2006.01) | |
| *B23K 103/22* | (2006.01) | |
| *B23K 103/24* | (2006.01) | |
| *B23K 103/16* | (2006.01) | |

(52) U.S. Cl.
CPC .......... *B23K 20/128* (2013.01); *B23K 20/129* (2013.01); *B23K 20/1215* (2013.01); *B23K 20/1245* (2013.01); *B23K 20/1265* (2013.01); *B23K 20/1295* (2013.01); *B23K 20/227* (2013.01); *B23K 20/2275* (2013.01); *B23K 20/2333* (2013.01); *B32B 3/30* (2013.01); *B32B 7/04* (2013.01); *B33Y 10/00* (2014.12); *B33Y 80/00* (2014.12); *B23K 2103/02* (2018.08); *B23K 2103/08* (2018.08); *B23K 2103/10* (2018.08); *B23K 2103/12* (2018.08); *B23K 2103/14* (2018.08); *B23K 2103/15* (2018.08); *B23K 2103/166* (2018.08); *B23K 2103/18* (2018.08); *B23K 2103/20* (2018.08); *B23K 2103/22* (2018.08); *B23K 2103/24* (2018.08); *B23K 2103/26* (2018.08); *B32B 2250/02* (2013.01); *B32B 2307/54* (2013.01); *B32B 2605/08* (2013.01); *B32B 2605/12* (2013.01); *B32B 2605/18* (2013.01)

(56) References Cited

U.S. PATENT DOCUMENTS

| | | | |
|---|---|---|---|
| 3,279,971 A | 10/1966 | Gardener | |
| 3,292,838 A | 12/1966 | Farley | |
| 3,418,196 A | 12/1968 | Luc | |
| 3,444,611 A | 5/1969 | Bogart | |
| 3,455,015 A | 7/1969 | Daniels et al. | |
| 3,466,737 A | 9/1969 | Hanink | |
| 3,495,321 A | 2/1970 | Shaff | |
| 3,537,172 A | 11/1970 | Voznesensky et al. | |
| 3,831,262 A | 8/1974 | Luc | |
| 3,899,377 A | 8/1975 | Luc | |
| 3,949,896 A | 4/1976 | Luc | |
| 4,023,613 A | 5/1977 | Uebayasi et al. | |
| 4,106,167 A | 8/1978 | Luc | |
| 4,144,110 A | 3/1979 | Luc | |
| 4,491,001 A | 1/1985 | Yoshida et al. | |
| 4,625,095 A | 11/1986 | Das | |
| 4,824,295 A | 4/1989 | Sharpless | |
| 4,930,675 A | 6/1990 | Bedford et al. | |
| 4,959,241 A | 9/1990 | Thomas et al. | |
| 5,056,971 A | 10/1991 | Sartori | |
| 5,079,825 A * | 1/1992 | Matsui .................. | B21D 39/03 29/520 |
| 5,106,702 A * | 4/1992 | Walker .................. | C22C 21/12 428/614 |
| 5,249,778 A | 10/1993 | Steichert et al. | |
| 5,262,123 A | 11/1993 | Thomas et al. | |
| 5,308,408 A * | 5/1994 | Katila .................. | C22C 38/04 148/328 |
| 5,330,160 A | 7/1994 | Eisermann et al. | |
| 5,460,317 A | 10/1995 | Thomas et al. | |
| 5,469,617 A | 11/1995 | Thomas et al. | |
| 5,611,479 A | 3/1997 | Rosen | |
| 5,637,836 A | 6/1997 | Nakagawa et al. | |
| 5,697,511 A | 12/1997 | Bampton | |
| 5,697,544 A | 12/1997 | Wykes | |
| 5,713,507 A | 2/1998 | Holt et al. | |
| 5,718,366 A | 2/1998 | Colligan | |
| 5,769,306 A | 6/1998 | Colligan | |
| 5,794,835 A | 8/1998 | Colligan et al. | |
| 5,813,592 A | 9/1998 | Midling et al. | |
| 5,826,664 A | 10/1998 | Richardson | |
| 5,893,507 A | 4/1999 | Ding et al. | |
| 5,971,247 A | 10/1999 | Gentry | |
| 5,971,252 A | 10/1999 | Rosen et al. | |
| 5,975,406 A | 11/1999 | Mahoney et al. | |
| 6,021,821 A | 2/2000 | Wegman | |
| 6,024,141 A | 2/2000 | Wegman | |
| 6,029,879 A | 2/2000 | Cocks | |
| 6,045,027 A | 4/2000 | Rosen et al. | |
| 6,045,028 A | 4/2000 | Martin et al. | |
| 6,050,474 A | 4/2000 | Aota et al. | |
| 6,050,475 A | 4/2000 | Kinton et al. | |
| 6,051,325 A | 4/2000 | Talwar et al. | |
| 6,053,391 A | 4/2000 | Heideman et al. | |
| 6,070,784 A | 6/2000 | Holt et al. | |
| 6,119,624 A | 9/2000 | Morikawa et al. | |
| 6,138,895 A | 10/2000 | Oelgoetz et al. | |
| 6,168,066 B1 | 1/2001 | Arbegast | |
| 6,168,067 B1 | 1/2001 | Waldron et al. | |
| 6,173,880 B1 | 1/2001 | Ding et al. | |
| 6,193,137 B1 | 2/2001 | Ezumi et al. | |
| 6,199,745 B1 | 3/2001 | Campbell et al. | |
| 6,206,268 B1 | 3/2001 | Mahoney | |
| 6,213,379 B1 | 4/2001 | Takeshita et al. | |
| 6,227,430 B1 | 5/2001 | Rosen et al. | |
| 6,230,957 B1 | 5/2001 | Arbegast et al. | |
| 6,237,829 B1 | 5/2001 | Aota et al. | |
| 6,237,835 B1 | 5/2001 | Litwinski et al. | |
| 6,247,633 B1 | 6/2001 | White et al. | |
| 6,247,634 B1 | 6/2001 | Whitehouse | |
| 6,250,037 B1 | 6/2001 | Ezumi et al. | |
| 6,257,479 B1 | 7/2001 | Litwinski et al. | |
| 6,259,052 B1 | 7/2001 | Ding et al. | |
| 6,264,088 B1 | 7/2001 | Larsson | |
| 6,273,323 B1 | 8/2001 | Ezumi et al. | |
| 6,276,591 B1 | 8/2001 | Kawasaki et al. | |
| 6,290,117 B1 | 9/2001 | Kawasaki et al. | |
| 6,299,048 B1 | 10/2001 | Larsson | |
| 6,299,050 B1 | 10/2001 | Okamura et al. | |
| 6,302,315 B1 | 10/2001 | Thompson | |
| 6,305,866 B1 | 10/2001 | Aota et al. | |
| 6,311,889 B1 | 11/2001 | Ezumi et al. | |
| 6,315,187 B1 | 11/2001 | Satou et al. | |
| 6,321,975 B1 | 11/2001 | Kawasaki et al. | |
| 6,325,273 B1 | 12/2001 | Boon et al. | |
| 6,325,274 B2 | 12/2001 | Ezumi et al. | |
| 6,328,261 B1 | 12/2001 | Wollaston et al. | |
| 6,352,193 B1 | 3/2002 | Bellino et al. | |
| 6,354,483 B1 | 3/2002 | Ezumi et al. | |
| 6,358,397 B1 * | 3/2002 | Lyublinski .............. | C23F 13/04 204/196.06 |
| 6,360,937 B1 | 3/2002 | De Koning | |
| 6,364,197 B1 | 4/2002 | Oelgoetz et al. | |
| 6,367,681 B1 | 4/2002 | Waldron et al. | |
| 6,378,264 B1 | 4/2002 | Kawasaki et al. | |
| 6,378,754 B2 | 4/2002 | Aota et al. | |
| 6,382,498 B2 | 5/2002 | Aota et al. | |
| 6,386,425 B2 | 5/2002 | Kawasaki et al. | |
| 6,398,883 B1 | 6/2002 | Forrest et al. | |
| 6,413,610 B1 | 7/2002 | Nakamura et al. | |
| 6,419,142 B1 | 7/2002 | Larsson | |
| 6,419,144 B2 | 7/2002 | Aota | |
| 6,421,578 B1 | 7/2002 | Adams et al. | |
| 6,422,449 B1 | 7/2002 | Ezumi et al. | |

(56) References Cited

U.S. PATENT DOCUMENTS

| | | |
|---|---|---|
| 6,450,394 B1 | 9/2002 | Wollaston et al. |
| 6,450,395 B1 | 9/2002 | Weeks et al. |
| 6,457,629 B1 | 10/2002 | White |
| 6,460,752 B1 | 10/2002 | Waldron et al. |
| 6,461,072 B2 | 10/2002 | Kawasaki et al. |
| 6,464,127 B2 | 10/2002 | Litwinski et al. |
| 6,468,067 B1 | 10/2002 | Ikegami |
| 6,471,112 B2 | 10/2002 | Satou et al. |
| 6,474,533 B1 | 11/2002 | Ezumi et al. |
| 6,484,924 B1 | 11/2002 | Forrest |
| 6,494,011 B2 | 12/2002 | Ezumi et al. |
| 6,497,355 B1 | 12/2002 | Ding et al. |
| 6,499,649 B2 | 12/2002 | Sayama et al. |
| 6,502,739 B2 | 1/2003 | Ezumi et al. |
| 6,513,698 B2 | 2/2003 | Ezumi et al. |
| 6,516,992 B1 | 2/2003 | Colligan |
| 6,527,470 B2 | 3/2003 | Ezumi et al. |
| 6,536,651 B2 | 3/2003 | Ezumi et al. |
| 6,543,670 B2 | 4/2003 | Mahoney |
| 6,543,671 B2 | 4/2003 | Hatten et al. |
| 6,572,007 B1 | 6/2003 | Stevenson et al. |
| 6,582,832 B2 | 6/2003 | Kawasaki et al. |
| 6,599,641 B1 | 7/2003 | Nakamura et al. |
| 6,648,206 B2 | 11/2003 | Nelson et al. |
| 6,669,075 B2 | 12/2003 | Colligan |
| 6,676,004 B1 | 1/2004 | Trapp et al. |
| 6,676,008 B1 | 1/2004 | Trapp et al. |
| 6,722,556 B2 | 4/2004 | Schilling et al. |
| 6,732,901 B2 | 5/2004 | Nelson et al. |
| 6,745,929 B1 | 6/2004 | Ezumi et al. |
| 6,758,382 B1 | 7/2004 | Carter |
| 6,779,704 B2 | 8/2004 | Nelson et al. |
| 6,811,632 B2 | 11/2004 | Nelson et al. |
| 6,866,181 B2 | 3/2005 | Aota et al. |
| 6,908,690 B2 | 6/2005 | Waldron et al. |
| 6,953,140 B2 | 10/2005 | Park et al. |
| 7,036,708 B2 | 5/2006 | Park et al. |
| 7,066,375 B2 | 6/2006 | Bolser |
| 7,115,324 B1 | 10/2006 | Stol et al. |
| 7,124,929 B2 | 10/2006 | Nelson et al. |
| 7,152,776 B2 | 12/2006 | Nelson et al. |
| 7,156,276 B2 | 1/2007 | Slattery |
| 7,163,136 B2 | 1/2007 | Hempstead |
| 7,240,821 B2 | 7/2007 | Talwar |
| 7,445,212 B2 | 11/2008 | Gail et al. |
| 7,455,212 B2 | 11/2008 | Mika |
| 7,597,236 B2 | 10/2009 | Tolle et al. |
| 7,608,296 B2 | 10/2009 | Packer et al. |
| 7,624,910 B2 | 12/2009 | Barnes et al. |
| 7,661,572 B2 | 2/2010 | Nelson et al. |
| 7,732,033 B2 | 6/2010 | Aken et al. |
| 7,918,379 B2 | 4/2011 | Fujii et al. |
| 7,971,770 B2 | 7/2011 | Nakagawa et al. |
| 7,992,759 B2 | 8/2011 | Steel et al. |
| 8,052,034 B2 | 11/2011 | Fleming et al. |
| 8,061,579 B2 | 11/2011 | Feng et al. |
| 8,100,316 B2 | 1/2012 | Goehlich et al. |
| 8,220,693 B2 | 7/2012 | Krajewski et al. |
| 8,397,974 B2 | 3/2013 | Schultz et al. |
| 8,464,926 B2 | 6/2013 | Kou et al. |
| 8,479,970 B2 | 7/2013 | Ishibashi et al. |
| 8,632,850 B2 | 1/2014 | Schultz et al. |
| 8,636,194 B2 | 1/2014 | Schultz et al. |
| 8,678,268 B1 | 3/2014 | Obadtich et al. |
| 8,714,431 B2 | 5/2014 | Roos et al. |
| 8,857,696 B1 | 10/2014 | Merah et al. |
| 8,875,976 B2 | 11/2014 | Schultz et al. |
| 8,893,954 B2 | 11/2014 | Schultz et al. |
| 9,010,613 B1 | 4/2015 | Matlack et al. |
| 9,205,578 B2 | 12/2015 | Schultz et al. |
| 9,266,191 B2 | 2/2016 | Kandasamy et al. |
| 9,511,445 B2 | 12/2016 | Kandasamy |
| 9,511,446 B2 | 12/2016 | Kandasamy et al. |
| 9,643,279 B2 | 5/2017 | Schultz et al. |
| 9,862,054 B2 | 1/2018 | Kandasamy et al. |
| 9,943,929 B2 | 4/2018 | Schultz et al. |
| 10,105,790 B2 | 10/2018 | Kandasamy |
| 2001/0011674 A1 | 8/2001 | Ezumi et al. |
| 2002/0011509 A1 | 1/2002 | Nelson et al. |
| 2002/0014516 A1 | 2/2002 | Nelson et al. |
| 2002/0168466 A1 | 11/2002 | Tapphorn et al. |
| 2002/0179682 A1 | 12/2002 | Schilling et al. |
| 2003/0010805 A1 | 1/2003 | Nelson et al. |
| 2003/0042292 A1 | 3/2003 | Hatten et al. |
| 2003/0075584 A1 | 4/2003 | Sarik et al. |
| 2003/0098336 A1 | 5/2003 | Yamashita |
| 2003/0111147 A1 | 6/2003 | Keener et al. |
| 2003/0111514 A1 | 6/2003 | Miyanagi et al. |
| 2003/0192941 A1 | 10/2003 | Ishida et al. |
| 2003/0218052 A2 | 11/2003 | Litwinski |
| 2003/0226935 A1 | 12/2003 | Garratt et al. |
| 2004/0003911 A1 | 1/2004 | Vining et al. |
| 2004/0055349 A1 | 3/2004 | El-Soudani |
| 2004/0057782 A1 | 3/2004 | Okamoto et al. |
| 2004/0074949 A1 | 4/2004 | Narita et al. |
| 2004/0079634 A1* | 4/2004 | Wickersham, Jr. .... B21K 25/00 204/298.12 |
| 2004/0118899 A1 | 6/2004 | Aota et al. |
| 2004/0134971 A1 | 7/2004 | Narita et al. |
| 2004/0134972 A1 | 7/2004 | Nelson et al. |
| 2004/0149807 A1 | 8/2004 | Schilling et al. |
| 2004/0155093 A1 | 8/2004 | Nelson et al. |
| 2004/0159696 A1 | 8/2004 | Mahoney et al. |
| 2004/0195291 A1 | 10/2004 | Andersson et al. |
| 2004/0265503 A1 | 12/2004 | Clayton et al. |
| 2005/0006439 A1 | 1/2005 | Packer et al. |
| 2005/0045694 A1 | 3/2005 | Subramanian et al. |
| 2005/0045695 A1 | 3/2005 | Subramanian et al. |
| 2005/0051599 A1 | 3/2005 | Park et al. |
| 2005/0060888 A1 | 3/2005 | Park et al. |
| 2005/0121497 A1 | 6/2005 | Fuller et al. |
| 2005/0127139 A1 | 6/2005 | Slattery et al. |
| 2005/0210820 A1 | 9/2005 | Tanaka et al. |
| 2005/0242158 A1 | 11/2005 | Bolser |
| 2005/0247756 A1 | 11/2005 | Frazer et al. |
| 2005/0254955 A1 | 11/2005 | Helder et al. |
| 2006/0016854 A1 | 1/2006 | Slattery |
| 2006/0032891 A1 | 2/2006 | Flak et al. |
| 2006/0043151 A1 | 3/2006 | Stol et al. |
| 2006/0060635 A1 | 3/2006 | Slattery et al. |
| 2006/0086775 A1 | 4/2006 | Trapp et al. |
| 2006/0096740 A1 | 5/2006 | Zheng |
| 2006/0165486 A1 | 7/2006 | Ungurean |
| 2006/0208034 A1 | 9/2006 | Packer et al. |
| 2006/0289603 A1 | 12/2006 | Zettler et al. |
| 2007/0040006 A1 | 2/2007 | Tolle et al. |
| 2007/0044406 A1 | 3/2007 | Aken et al. |
| 2007/0075121 A1 | 4/2007 | Slattery |
| 2007/0102492 A1 | 5/2007 | Nelson et al. |
| 2007/0128463 A1 | 6/2007 | Dixon et al. |
| 2007/0138236 A1 | 6/2007 | Agarwal et al. |
| 2007/0187465 A1 | 8/2007 | Eyre et al. |
| 2007/0215675 A1 | 9/2007 | Barnes |
| 2007/0241164 A1 | 10/2007 | Barnes et al. |
| 2007/0295781 A1 | 12/2007 | Hunt et al. |
| 2007/0297935 A1 | 12/2007 | Langan et al. |
| 2008/0006678 A1 | 1/2008 | Packer et al. |
| 2008/0023524 A1 | 1/2008 | Ohashi et al. |
| 2008/0041921 A1 | 2/2008 | Creehan et al. |
| 2008/0047222 A1 | 2/2008 | Barnes |
| 2008/0135405 A1 | 6/2008 | Hori et al. |
| 2008/0245517 A1 | 10/2008 | Ishikawa et al. |
| 2009/0068492 A1 | 3/2009 | Fujii et al. |
| 2009/0090700 A1 | 4/2009 | Sato et al. |
| 2009/0152328 A1 | 6/2009 | Okamoto et al. |
| 2009/0188101 A1 | 7/2009 | Durandet et al. |
| 2009/0200275 A1 | 8/2009 | Twelves et al. |
| 2009/0236028 A1 | 9/2009 | Fukuda |
| 2009/0236403 A1 | 9/2009 | Feng et al. |
| 2009/0258232 A1 | 10/2009 | Brice |
| 2009/0266870 A1 | 10/2009 | Yousefiani et al. |
| 2010/0037998 A1 | 2/2010 | Bray et al. |
| 2010/0065611 A1 | 3/2010 | Fukuda |
| 2010/0068550 A1 | 3/2010 | Watson et al. |

(56) References Cited

U.S. PATENT DOCUMENTS

| | | |
|---|---|---|
| 2010/0089976 A1 | 4/2010 | Szymanski et al. |
| 2010/0089977 A1 | 4/2010 | Chen et al. |
| 2010/0101768 A1 | 4/2010 | Seo et al. |
| 2010/0146866 A1 | 6/2010 | Nelson et al. |
| 2010/0176182 A1 | 7/2010 | Hanlon et al. |
| 2010/0252614 A1 | 10/2010 | Fujii et al. |
| 2010/0258612 A1 | 10/2010 | Kolbeck et al. |
| 2010/0282717 A1 | 11/2010 | Ananthanarayanan |
| 2010/0284850 A1 | 11/2010 | Hawk |
| 2010/0285207 A1 | 11/2010 | Creehan et al. |
| 2010/0297469 A1 | 11/2010 | Aota et al. |
| 2011/0062219 A1 | 3/2011 | Bezaire et al. |
| 2011/0132968 A1 | 6/2011 | Nakagawa et al. |
| 2011/0132970 A1 | 6/2011 | Nakagawa et al. |
| 2011/0227590 A1 | 9/2011 | Killian et al. |
| 2011/0266330 A1 | 11/2011 | Bruck et al. |
| 2012/0009339 A1 | 1/2012 | Creehan et al. |
| 2012/0114897 A1 | 5/2012 | Thiagarajan et al. |
| 2012/0132342 A1 | 5/2012 | Kato et al. |
| 2012/0202089 A1 | 8/2012 | Hangai et al. |
| 2012/0237788 A1 | 9/2012 | Fujii et al. |
| 2012/0273113 A1 | 11/2012 | Hovanski et al. |
| 2012/0279043 A1 | 11/2012 | Carter |
| 2012/0279271 A1 | 11/2012 | Carter |
| 2012/0279441 A1 | 11/2012 | Creehan et al. |
| 2012/0279442 A1 | 11/2012 | Creehan et al. |
| 2012/0325894 A1 | 12/2012 | Chun et al. |
| 2014/0061185 A1 | 3/2014 | Schindele |
| 2014/0130736 A1 | 5/2014 | Schultz et al. |
| 2014/0134325 A1 | 5/2014 | Schultz et al. |
| 2014/0166731 A1 | 6/2014 | Seo et al. |
| 2014/0174344 A1 | 6/2014 | Schultz et al. |
| 2015/0165546 A1 | 6/2015 | Kandasamy et al. |
| 2016/0074958 A1 | 3/2016 | Kandasamy et al. |
| 2016/0107262 A1 | 4/2016 | Schultz et al. |
| 2016/0175981 A1 | 6/2016 | Kandasamy |
| 2016/0175982 A1 | 6/2016 | Kandasamy et al. |
| 2016/0325374 A1 | 11/2016 | Hori et al. |
| 2017/0043429 A1 | 2/2017 | Kandasamy |
| 2017/0197274 A1 | 7/2017 | Steel et al. |
| 2017/0216962 A1 | 8/2017 | Schultz et al. |
| 2017/0312850 A1 | 11/2017 | Werz et al. |
| 2018/0085849 A1 | 3/2018 | Kandasamy et al. |
| 2018/0361501 A1 | 12/2018 | Hardwick et al. |

FOREIGN PATENT DOCUMENTS

| | | |
|---|---|---|
| CN | 203738226 | 7/2014 |
| EP | 0453182 A | 10/1991 |
| EP | 0458774 A | 11/1991 |
| EP | 0458774 A1 | 11/1991 |
| EP | 0410104 B1 | 7/1993 |
| EP | 0597335 A | 5/1994 |
| EP | 0597335 A1 | 5/1994 |
| EP | 1206995 A2 | 5/2002 |
| EP | 1543913 B1 | 8/2007 |
| EP | 1790425 B1 | 10/2011 |
| EP | 2783976 A1 | 10/2014 |
| GB | 572789 A | 10/1945 |
| GB | 1224891 A | 3/1971 |
| GB | 2270864 A | 3/1994 |
| GB | 2306366 A | 5/1997 |
| JP | 10286682 | 10/1998 |
| JP | 11156561 | 6/1999 |
| JP | 11267857 | 10/1999 |
| JP | 11320128 | 11/1999 |
| JP | 2002153976 | 5/2002 |
| JP | 2002192358 | 7/2002 |
| JP | 2002256453 A | 9/2002 |
| JP | 2002283069 | 10/2002 |
| JP | 2004025296 | 1/2004 |
| JP | 2004261859 | 9/2004 |
| JP | 2004298955 | 10/2004 |
| JP | 2007222925 | 9/2007 |
| JP | 2007283317 | 11/2007 |
| JP | 2008254047 | 10/2008 |
| JP | 2009148821 | 7/2009 |
| JP | 2010149134 | 7/2010 |
| JP | 2010279958 A | 12/2010 |
| JP | 2011056582 | 3/2011 |
| JP | 2011079031 A | 4/2011 |
| JP | 2013049091 | 3/2013 |
| JP | 2015085382 A | 5/2015 |
| KR | 101256970 | 4/2013 |
| KR | 101278097 B1 | 6/2013 |
| RU | 1393566 | 5/1988 |
| SU | 266539 A | 11/1976 |
| WO | 1993010935 A1 | 6/1993 |
| WO | 0174525 | 10/2001 |
| WO | 2011137300 A2 | 11/2011 |
| WO | 2013002869 A2 | 1/2013 |
| WO | 2013095031 A1 | 6/2013 |
| WO | 2019089764 A1 | 5/2019 |

OTHER PUBLICATIONS

Co-pending U.S. Appl. No. 11/527,149, filed Sep. 26, 2006 (published as 2008/0041921 on Feb. 21, 2008), now abandoned.

Co-pending U.S. Appl. No. 12/792,655, filed Jun. 2, 2010 (published as 2010/0285207 on Nov. 11, 2010, now U.S. Pat. No. 8,636,194 issued on Jan. 28, 2014).

Co-pending U.S. Appl. No. 14/163,253, filed Jan. 24, 2014, Published as US 2014/0134325 on May 15, 2014, and Issued as U.S. Pat. No. 8,893,954 on Nov. 25, 2014.

Co-pending U.S. Appl. No. 15/489,389, filed Apr. 17, 2017.

Co-pending Application No. PCT/US12/32793 filed Apr. 9, 2012 (published as WO2013/002869 on Jan. 3, 2013).

Co-pending U.S. Appl. No. 12/987,588, filed Jan. 10, 2011 (published as 2012/0009339 on Jan. 12, 2012), now U.S. Pat. No. 8,632,850 issued on Jan. 21, 2014.

Co-Pending U.S. Appl. No. 13/442,201, filed Apr. 9, 2012, Published as US 2012/0279441 on Nov. 8, 2012, and Issued as U.S. Pat. No. 8,875,976 on Nov. 4, 2014.

Co-Pending U.S. Appl. No. 13/442,201, Issued as U.S. Pat. No. 8,875,976 on Nov. 4, 2014, 18 pages.

Co-pending U.S. Appl. No. 13/442,285, filed Apr. 9, 2012 (published as 2012/0279442 on Nov. 8, 2012), now U.S. Pat. No. 8,397,974 issued on Mar. 19, 2013.

Co-pending U.S. Appl. No. 14/159,105, filed Jan. 20, 2014, Published as US 2014/0130736 on May 15, 2014, and Issued as U.S. Pat. No. 9,205,578 on Dec. 8, 2015.

Co-Pending U.S. Appl. No. 14/193,579, filed Feb. 28, 2014 (Published as US 2014/0174344 on Jun. 26, 2014).

Co-Pending U.S. Appl. No. 14/573,430, filed Dec. 17, 2014, Published as US 2015/0165546 on Jun. 18, 2015, and Issued as U.S. Pat. No. 9,266,191 on Feb. 23, 2016.

Co-Pending U.S. Appl. No. 14/573,430, filed Dec. 17, 2014.

Co-Pending U.S. Appl. No. 14/640,077, filed Mar. 6, 2015, published as US2016/0175981 on Jun. 23, 2016 and Issued as U.S. Pat. No. 9,511,445 on Dec. 6, 2016.

Co-Pending U.S. Appl. No. 14/643,396, filed Mar. 10, 2015.

Co-Pending U.S. Appl. No. 14/926,447, filed Oct. 29, 2015, published as US2016/0107262 on Apr. 21, 2016.

Co-Pending U.S. Appl. No. 14/954,104, filed Nov. 30, 2015, published as US20160074958 on Mar. 17, 2016.

Co-Pending U.S. Appl. No. 15/334,392, filed Oct. 26, 2016, published as US20170043429 on Feb. 16, 2017.

Davis, JR, editor, Handbook of Thermal Spray Technology, ASM International (2004), pp. 138-139.

Friction Stir Tooling: Tool Materials and Designs, Chapter 2 in Friction Stir Welding and Processing, pp. 7-35, ASM International, Editors Rajiv S. Mishra & Murray W Mahoney, 2007.

Geiger et al., "Friction stir knead welding of steel aluminum butt joints." International Journal of Machine Tools & Manufacture, vol. 48, pp. 515-521, 2008.

International Preliminary Report on Patentability of International Application No. PCT/US2012/032793, dated Oct. 8, 2013, 7 pages.

International Search Report and Written Opinion of International Application No. PCT/US2012/032793, dated Dec. 18, 2012.

(56) References Cited

OTHER PUBLICATIONS

Kallee et al., "Friction stir welding—invention, innovations and applications." INALCO 2001, 8th International Conference on Joints in Aluminium, Munich, Germany, 19 pages.
Metal-Matrix Composites (ASM Metals Handbook Online, ASM International, 2002), Introduction, Aluminum-Matrix Composites.
The American Welding Society. The Everyday Pocket Handbook on Welded Joint Details for Structural Applications. 2004.
Co-pending Application No. PCT/US18/58470 filed Oct. 31, 2018 (published as WO2019/089764 on May 9, 2019).
Co-pending Application No. PCT/US19/21910 filed Mar. 12, 2019.
Co-pending Application No. PCT/US19/37968 filed Jun. 19, 2019.
Co-Pending U.S. Appl. No. 15/829,038, filed Dec. 1, 2017, Published as US 2018/0085849 on Mar. 29, 2018.

* cited by examiner

IN-SITU INTERLOCKING OF METALS USING ADDITIVE FRICTION STIR PROCESSING

CROSS-REFERENCE TO RELATED APPLICATIONS

The present application is a Divisional of U.S. patent application Ser. No. 14/643,396 filed Mar. 10, 2015, which published as U.S. Patent Application Publication No. 20160175982 on Jun. 23, 2016. The '396 application is a Continuation-in-Part (CIP) of U.S. patent application Ser. No. 14/573,430 filed Dec. 17, 2014, which issued as U.S. Pat. No. 9,266,191 on Feb. 23, 2016. The disclosures of these applications are incorporated herein by reference in their entireties.

BACKGROUND OF THE INVENTION

Field of the Invention

The present invention is in the field of solid state materials joining. In particular the invention is in the field of joining, coating, or cladding of metals, such as two dissimilar or incompatible materials that are not typically recommended for conventional coating or cladding or joining.

Description of Related Art

Friction-stir processing provides for the solid state joining of pieces of metal at a joint region through the generation of frictional heat at the joint and opposed portions of the metal pieces by cyclical movements of a tool piece that is harder than the metal pieces. An example of this is provided by International Application Publication No. PCT/GB1992/002203. Frictional heat produced between the substrate and the tool during the process causes the opposed portions of the substrate to soften, and mechanical intermixing and pressure cause the two materials to join. Typically, two materials are placed side-by-side and are joined together at the seam between the two.

Additive friction-stir fabrication, invented by the present inventors (see U.S. Pat. Nos. 8,636,194; 8,632,850; 8,875,976; and 8,397,974, the contents of which are hereby incorporated by reference in their entireties), is an additive process for joining materials. Additive friction-stir fabrication (FSF) processes use shear-induced interfacial heating and plastic deformation to deposit metallic coatings onto metal substrates. FSF coatings have bond strengths superior to those of thermally sprayed coatings, and have the potential to enhance corrosion resistance, enhance wear resistance, repair damaged or worn surfaces, and act as an interfacial layer for bonding metal matrix composites. In this process, the coating material, such as a metal alloy, is fed through a rotating spindle or tool to the substrate surface. As shown in FIG. 1, frictional heating occurs at the filler/substrate interface due to the rotational motion of the filler material, such as a rod 23, at an angular velocity ω and the downward pressure P applied. The mechanical shearing that occurs at the interface acts to disperse any oxides or boundary layers, resulting in a metallurgical bond between the substrate 10 and filler material/coating 25. As the substrate 10 moves relative to the tool 15, the coating is extruded under the rotating shoulder of the stirring tool 15.

Conventional techniques are incapable of bonding dissimilar materials such as steel and aluminum. Currently, explosive bonding is used to achieve solid state cladding of dissimilar materials. Explosive bonding uses controlled detonations to accelerate one metal plate into another creating an atomic bond. This method has numerous limitations related to material pairing, thickness and the environment in which it is conducted. Additional techniques include those described by Geiger M. et al, Friction Stir Knead Welding of steel aluminum butt joints, International Journal of Machine Tools & Manufacture 48 (2008) 515-521), and those described in U.S. Patent Application Publication No. 20120273113, U.S. Pat. No. 4,023,613, and Chinese Patent No. CN 102120287 B. Despite these efforts, however, there remains a need in the art for new techniques for joining dissimilar materials.

SUMMARY OF THE INVENTION

Provided by embodiments of the invention is a highly scalable process for coating, joining direct digital manufacturing of wrought metal structures based on friction stir fabrication (FSF) processes. Embodiments provide a solid-state wrought metal joining process which uses shear-induced interfacial heating and plastic deformation to coat and join metals. Of particular interest are the production of substrates comprising one or more of: multi-material parts, wrought microstructure, full density (low porosity), layer-to-layer bond strength comparable to base metal UTS, the joining of parts, wrought mechanical and physical properties, and/or by a method that is not contamination prone. Using these state-of-the-art techniques it is possible to produce high-strength coatings, welds, and structures (strengths comparable to the base metal UTS), while retaining a wrought microstructure. For example, in embodiments of the solid-state wrought metal joining process, filler material is deposited through a rotating spindle to the substrate surface or joint, frictional heating occurs at the filler/substrate interface, and mechanical shearing together results in a metallurgical bond between the substrate(s) and filler material, while retaining a wrought microstructure. The inventive structures exhibit superior qualities compared to structures having a solidification microstructure (i.e. cast microstructure). Benefits of the invention include the capability of creating substrates with little to no porosity, a typical undesirable result of parts prepared using molds.

Methods, tools, and systems of the invention provide for freeform manufacturing of 3-D parts having a wrought microstructure. In embodiments, friction-based fabrication may be a solid state, friction-based coating method that can be used, for example, to meet naval needs for welding, coating and repair of aluminum vessels. Friction-based fabrication according to the invention uses shear-induced interfacial heating and plastic deformation to deposit wrought metal coatings and/or metal matrix composite (MMC) coatings on substrates, where MMC coatings can be formed in the same manner as a wrought coating. The mechanical shearing that occurs at the interface acts to disperse any oxides or boundary layers, resulting in a metallurgical bond between the substrate and coating. Metallurgical bonding and/or homogenization and/or refinement of the microstructure between the substrate and coating can be achieved through rotation and/or translation or other relative movement between the tool and substrate. The additive-type fabrication processes of embodiments of the invention is suitable for direct manufacturing of parts by computer assisted design (CAD) techniques, otherwise referred to as digital manufacturing. Methods, tooling, and systems of the present invention are capable of providing metal substrates comprising a digitally manufactured functionally graded coating exhibiting a layered wrought microstructure with no discrete interface between layers.

The present invention is a method for joining materials using additive friction stir techniques. The method can be used to join a material to a substrate, especially where the material to be joined and the substrate comprise dissimilar metals.

One such method comprises (a) providing a substrate with one or more grooves; (b) rotating and translating an additive friction-stir tool relative to the substrate; (c) feeding a filler material through the additive friction-stir tool; and (d) depositing the filler material into the one or more grooves of the substrate. In preferred embodiments, substrate(s) with multiple grooves are provided. Translation and rotation of the tool causes heating and plastic deformation of the filler material, which flows into the grooves of the substrate resulting in an interlocking bond between the substrate and filler material. In embodiments, the depositing of the filler material causes deformation of the grooves in the substrate and an interlocking configuration between the grooves of the substrate and the filler material results.

The grooves of the substrate can have an opening, a base, and parallel sidewalls extending from the opening to the base. In embodiments, the grooves have an opening, a base, and perpendicular sidewalls extending from the opening to the base thereby providing the groove with a square or rectangular shaped cross section. In other embodiments, the grooves have an opening, a base, and parallel sidewalls sloping from the opening to the base. Additionally or alternatively, the grooves can have an opening, a base, and sidewalls sloping in opposite directions from the opening to the base. The opening of the groove can have a width larger than a width of the base. The opening can alternatively have a width smaller than a width of the base, thereby providing the groove with a dovetail shaped cross section.

According to embodiments, the methods can comprise deforming the opening to the groove thereby providing a mechanical lock between the filler material and the groove. The deforming can be performed during the depositing of the filler material into the grooves of the first substrate.

In preferred embodiments, the first substrate and the filler material can each be metal. For example, the first substrate and the filler material can each be metal independently chosen from steel, Al, Ni, Cr, Cu, Co, Au, Ag, Mg, Cd, Pb, Pt, Ti, Zn, Fe, Nb, Ta, Mo, W, or an alloy comprising one or more of these metals. In particular embodiments, the first substrate comprises steel and the filler material is metal chosen from steel, Al, Ni, Cr, Cu, Co, Au, Ag, Mg, Cd, Pb, Pt, Ti, Zn, Fe, Nb, Ta, Mo, W, or an alloy comprising one or more of these metals. The filler material can be a powder, pellet, rod, or powdered-filled cylinder.

Another method includes providing a sheet of metal or a metal plate as a second substrate and deforming and depositing the sheet of metal or the metal plate into the one or more grooves of the substrate.

Articles of manufacture are also included within the scope of the invention. For example, included is an article of manufacture comprising: two different metals disposed in an interlocking configuration; and a joint between the two metals along an area of interlocking; wherein a cross section of the joint reveals each of the two metals having a portion providing two-dimensional projections into the area of interlocking; and wherein the two-dimensional projections are of concave polygon shaped.

Methods for coating, cladding, or joining two dissimilar materials are particular features of the invention. In one embodiment, the method comprises providing a first substrate and a second substrate, wherein the first substrate has grooves disposed on a surface of the first substrate. The method further comprises overlaying the first substrate with the second substrate and moving a rotating additive friction-stir tool along the second substrate over the grooves so that it heats the second substrate. A consumable portion of the additive friction stir tool combines with the second substrate and they are plasticized together so that the plasticized material flows into the grooves, allowing the first material to be bonded to the second material through an interlocking connection. In yet another embodiment, the method comprises provided a substrate with grooves disposed on the surface of the substrate. The method further comprises moving a rotating additive friction stir tool along the grooves. A consumable material from the rotating additive friction stir tool flows into the grooves, while friction from the rotating additive friction stir tool deforms the grooves and locks the deposited material into the grooves.

The methods of the invention are useful for creating a variety of composite materials with layers of dissimilar composition and properties. Practical applications of these composite materials include use as components for manufacturing automobiles, ships, tanks, planes, and aerospace vehicles.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Figure 1:
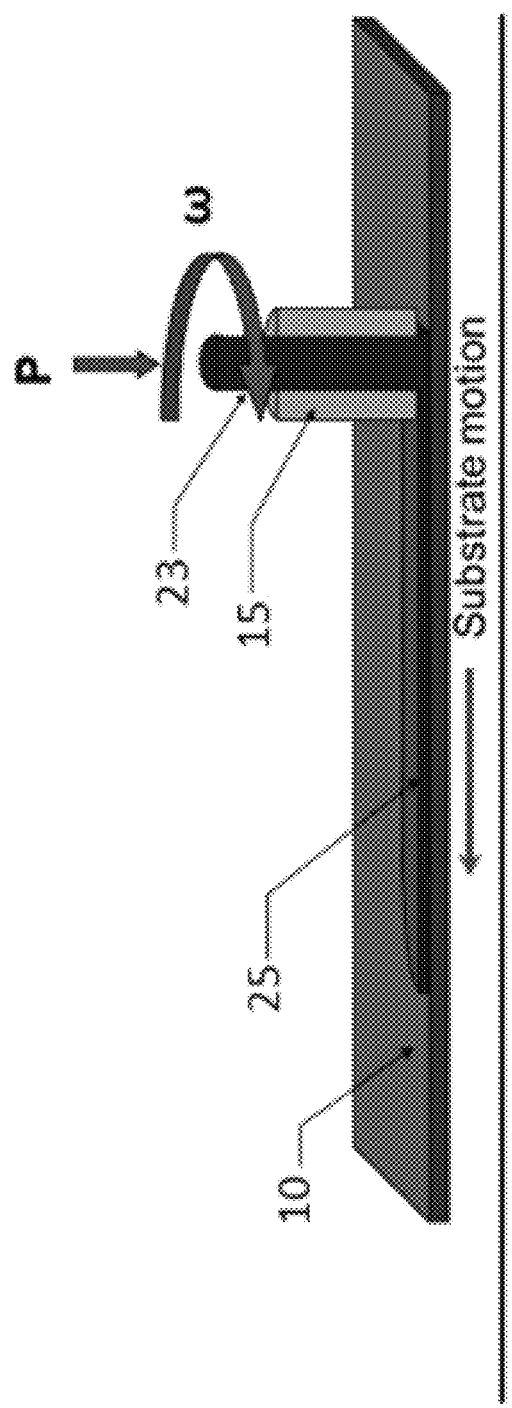
FIG. 1 is a schematic diagram showing an additive friction stir process.
Figure 2:
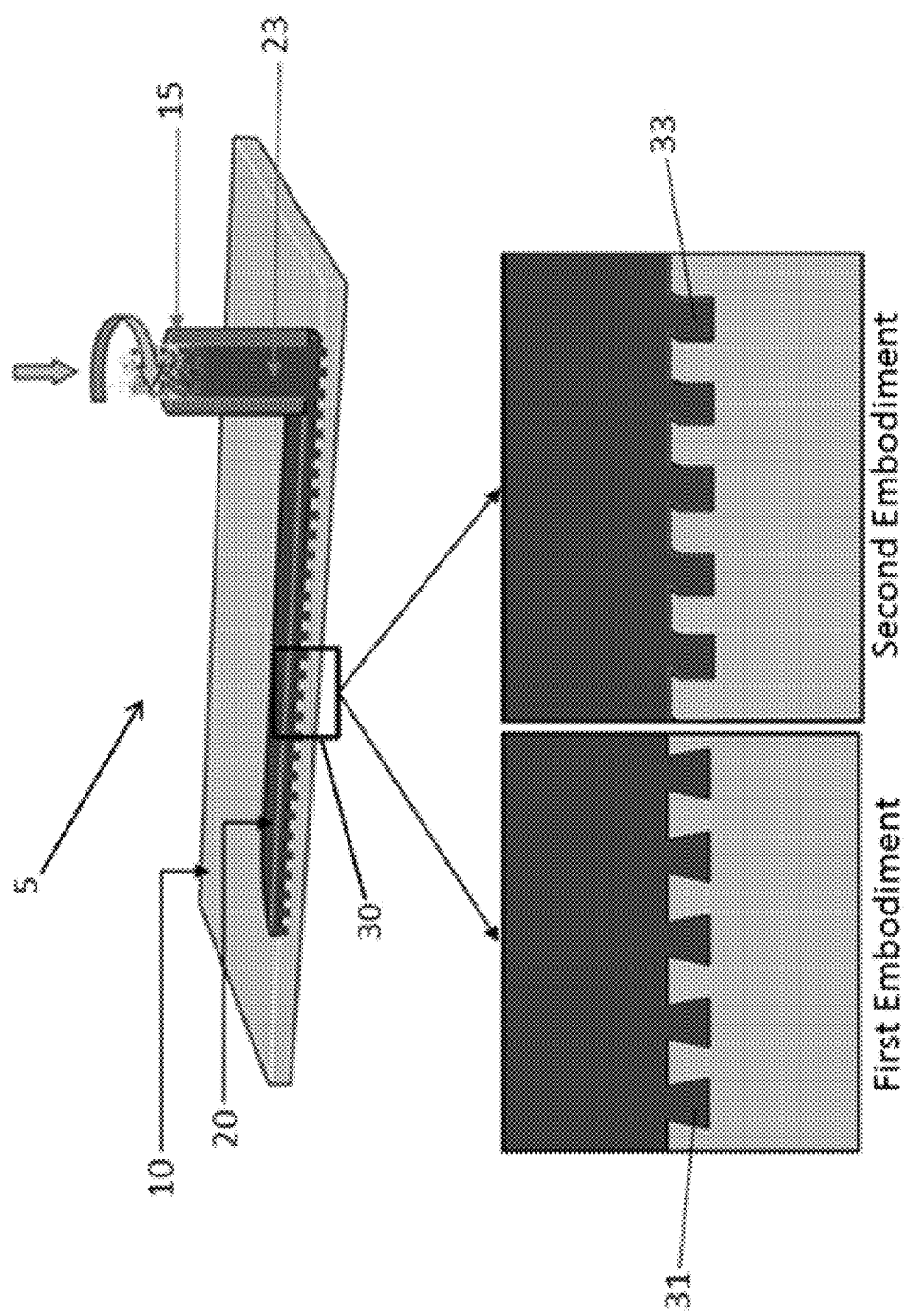
FIG. 2 is a schematic diagram showing mechanical interlocking method embodiments using additive friction stir.

FIG. 2 shows a general process 5 of material coating, cladding, or joining through mechanical interlocking. The process preferably comprises the coating, cladding, or joining of materials, such as dissimilar materials for example two different metals. The general process involves coating, cladding, or joining a material to a first substrate 10 having a grooved surface 30. Any number of grooves or type of groove pattern can be used. In preferred embodiments, multiple grooves are present in the substrate, such as from 1-100 grooves, or from 5-50 grooves, or from 10-40 grooves, or from 20-30 grooves, such as 2, 3, 4, 5, 6, 7, 8, 9, 10, 11, 12, 13, 14, 15, 16, 17, 18, or 19 grooves are present in the substrate. The number of grooves may be dependent on the particular application and/or size of substrate being used. Methods of creating the grooves in the substrates can include laser machining, friction based machining, conventional machining, and/or metal forming on the surface or the edges of the substrate to name a few.

One embodiment of the method is designed to join a coating of dissimilar material to a substrate. As shown in FIG. 2, the friction stir tool 15 is passed directly over the first substrate 10 over the grooved surface 30. In this embodiment, the grooves may include dove-tail shaped grooves 31, but preferably square-shaped grooves 33. The rotating friction-stir tool 15, typically non-consumable (or harder than the substrate and filler materials), is fed with a consumable filler material 23 (such as a powder or rod) such that the consumable filler material 23 is deposited into the grooves 33 while friction produced by the friction-stir tool 15 generates plastic deformation of the grooves to interlock the deposited material into the grooves 33. Thus, additive friction stir tool 15 will touch the grooved surface 33 to deform the grooves 33 and lock the deposited metal into the grooves 33.

Another embodiment of the invention comprises an additive friction stir method comprising providing a substrate having a grooved surface, translating a rotating additive friction-stir tool along the surface of the substrate along a vector that overlies one or more of the grooves of the grooved surface, and feeding the rotating friction-stir tool with a filler material (e.g., consumable filler material) such that the filler material is deposited into the grooves while friction produced by the friction-stir tool generates plastic deformation of the grooves to overlap a portion of the deposited filler material disposed within the grooves, thereby interlocking the substrate and filler.

Articles of manufacture can be prepared by such processes and can include articles of manufacture comprising metals (preferably two different metals) disposed in an interlocking configuration with a joint between the two metals along an area of interlocking; wherein a cross section of the joint reveals each of the two metals having a portion providing two-dimensional projections into the area of interlocking; and wherein the two-dimensional projections are of concave polygon shape. For example, shown in FIG. 2 are cross-sectional views of the joints (with grooves 31, 33) of each of two embodiments of articles of manufacture that can be prepared according to the invention. As illustrated, the metals on both sides of the joint with grooves 31 each have two-dimensional projections into the area of interlocking that are of a convex polygon shape, and are the same shape. In contrast, the metals of the joint with grooves 33 on either side of the joint have two-dimensional projections into the area of interlocking that are a concave polygon shape. Additionally, the two-dimensional projection on one side of the joint with grooves 33 is the same shape as the two-dimensional projection on the other side of the joint. The two-dimensional projections on either side of the joint can be the same or different shapes and all on one side can be the same or different shapes.

In another embodiment, a pre-fabricated layer (such as a sheet or plate) of material can be joined to a substrate. The substrate comprises a grooved surface and can include grooves that are interlocking in shape such as dovetail grooves 31. The grooves can have an opening, a base, and sidewalls sloping in opposite directions from the opening to the base. The opening of the grooves can have a width smaller than a width of the base of the grooves, or the opening of the grooves can have a width larger than a width of the base. In one embodiment, the grooves are provided with a dovetail shaped cross section when the grooves have a width smaller than a width of the base and when the sidewalls are also sloping in opposite directions from the opening to the base. In other embodiments, the grooves of the substrate can have an opening, a base, and parallel sidewalls extending from the opening to the base. In such embodiments, the grooves can have a square or rectangular shaped cross section.

In methods where a sheet of metal or a metal plate is used, a second substrate 20 is disposed on the first substrate 10 over the grooves 30 of the grooved surface of the first substrate. Further, in embodiments, there is no depression or groove(s) on the surface of the second substrate. An additive friction-stir tool 15 is passed over the second substrate 20 along a vector overlying one or more of the grooves 30. The friction-stir tool 15 rotates and during rotation a filler material 23 (such as a powder or rod) is fed through the friction-stir tool 15. Interaction of the rotating non-consumable friction-stir tool 15 with the second substrate 20 generates plastic deformation at an interface between the rotating non-consumable friction-stir tool 15 and the second substrate 20 such that the consumable filler 23 and the second substrate 20 are extruded into one or more of the grooves 30 of the first substrate 10 to interlock the second substrate 20 with the first substrate 10. Thus, deposition can be performed with or without touching the additive friction stir tool 15 to the grooves 30 on the surface of the first substrate 10. In this case, a dovetail type groove 31 pattern will be most beneficial for achieving improved joint properties.

Thus, one embodiment of the invention provides an additive friction stir method comprising providing a first substrate having a grooved surface, providing a second substrate having a composition that is different than the first substrate, overlaying the second substrate over the first substrate such that a surface of the second substrate is in communication with the grooved surface, translating a rotating non-consumable friction-stir tool along an opposing surface of the second substrate along a vector that overlies one or more grooves of the grooved surface and feeding the rotating non-consumable friction-stir tool with a consumable filler material such that interaction of the rotating non-consumable friction-stir tool with the second substrate generates plastic deformation at an interface between the rotating non-consumable friction-stir tool and the second substrate such that the consumable filler and second substrate are extruded through the one or more of the grooves of the first substrate to interlock the second substrate with the first substrate in situ.

In this embodiment, during translating the rotating non-consumable friction stir tool does not penetrate the second substrate, so that no depression is formed on the surface of the second substrate. Thus, the non-consumable portion of the tool may generate friction at the surface of the second substrate without substantial penetration into the second substrate. Not wishing to be bound by theory, this may be due to the addition of consumable filler material being added during the process where a volume of filler material is provided underneath the non-consumable portion of the tool.

The steps of the methods may be repeated to add successive layers of materials. For example, upon joining of a first substrate with a second substrate, the surface of the second substrate may be machined to form a grooved surface. Then a third layer may be added using the first or second embodiment of the method, and so on. Possibilities include the manufacture of bimetallic composites with alternating layers or multi-metallic composites with completely different layers. Composites with three, four, five, six, seven, eight, nine, ten or more layers are even possible.

Methods of the invention may include combinations of the features of the embodiments described above. Some embodiments may need machining of dovetail grooves 31, and other embodiments may only need simple square-shaped grooves 33, which are economical in terms of machining. However, other embodiments may include some combination of dovetail grooves 31 and square-shaped grooves 33. Additionally, a method of the invention may include (1) providing a first substrate with a grooved surface (2) overlaying a portion of the first substrate with a second substrate, leaving some portions of the first substrate exposed (3) translating an additive friction stir tool over the second substrate in a vector overlying the grooves (4) translating an additive friction stir tool directly over the first substrate at the exposed portions (5) optionally, repeating steps 1-4. Alternatively, the second substrate may include multiple panels of different thicknesses or material types. In this way, it is possible to introduce features into the surface geometries of the joined materials.

The joint strength of the samples produced in these methods will depend on the geometry of the groove pattern and the surface characteristics of the grooved surfaces. Finite element analysis can be conducted to predict the optimal grove geometry and surface characteristics. Desired groove pattern and surface characteristics can be achieved using different manufacturing processes such as various machining techniques, etching, milling, and/or plating. In one embodiment, grooves are machined on a surface of the first substrate through a Computer Numerical Control (CNC) machine. The grove patterns may be programmed in Computer-Aided Design (CAD) programs. The grooves may be of any uniform geometric shape, including polygonal shapes (e.g. square, rectangular, triangular, trapezoidal), complex polygon shapes (e.g. combinations of two or more polygonal shapes, or convex or concave polygon shapes), or nonpolygonal shape (e.g. semi-circular, semi-oval). Further, the groove pattern may include multiple grooves representing different shapes. The density of the groove pattern will depend on the size of the grooves, with smaller grooves being provided at a higher density on the surface than larger grooves. The size of the grooves depends on the particular application and the size of the additive friction stir tool used. For example, for certain substrates, the depth of the grooves from the opening to the base of the groove (measured perpendicularly from the opening to the base) may range anywhere from 10 micrometers to 10 mm in depth or width, or any range in between, including 10 micrometers to 1 mm, and 1 mm to 10 mm. Thicker materials are capable of even deeper grooves for bonding, including those exceeding 10 mm, such as 1 cm, 10 cm, or between 10-100 cm or more. The grooves may be provided at uniform or varying depth. General dimensions may range from shallow and wide to deep and narrow or anywhere in between. The optimal size and shape of the grooves may be achievable through routine experimentation. The grooves may be present on the first substrate in any pattern, including linear and non-linear. After obtaining the desired groove pattern and surface characteristics, additive friction stir can be used to interlock the filler material and/or second substrate to the first substrate using any of the methods described in this specification.

Various combinations of materials may serve as the filler material, or the first and second substrate. Suitable materials include a difference in melting temperature, density, and/or hardness of up to about 50%, such as from 2-20%, including at least about 10%. In one embodiment, materials that have a higher melting temperature or that are denser or harder serve as the first substrate, and materials that have a lower melting temperature or are less dense or lighter serve as the filler material and/or second substrate.

Materials that may serve as the filler material or as the first and second substrate may include metals and metallic materials, polymers and polymeric materials, ceramics and ceramic materials, as well as combinations of these materials. Metal matrix and polymer matrix composites, as well as metal to polymer joints are also included within the scope of the invention. The filler material, and the first and second substrate may include without limitation metal-metal combinations, polymer-polymer combinations, metal-polymer combinations, metal-ceramic combinations, and polymer-ceramic combinations. The material of the first substrate should have a machinable surface for forming the described grooves. In one particular embodiment, the first and second substrates and/or the filler material are metal or metallic. The filer material, or the first substrate and second substrate may be independently selected from any metal, including for example steel, Al, Ni, Cr, Cu, Co, Au, Ag, Mg, Cd, Pb, Pt, Ti, Zn, Fe, Nb, Ta, Mo, W, or an alloy comprising one or more of these metals. In embodiments, the first substrate and second substrate may be provided as sheet metal or metallic plates in a variety of dimensions for joining, including with a width and/or length of from about 1 inch to about 20 feet, such as for example 2'×2', 2'×3', 2'×4', 3'×4', 4'×4', 5'×5, 6'×4', and the like. The size of the sheets is highly dependent on and can fit any desired application. Depths of the substrates as described above may be on the order of micrometers to centimeters.

In one embodiment, the first substrate has a density in the range of 7.75-8.10 g/cm$^3$, a thermal expansion of 9.0-20.7 $10^{-6}$/k, a melting point in the range of 1371-1454° C., a tensile strength of 515-827 MPa, and a hardness of 137-595 Brinell, and the filler material and/or second substrate has a density in the range of 2.50-3.00 g/cm$^3$, a thermal expansion in the range of 20.4-25.0 $10^{-6}$/k, a melting point in the range of 600-700° C., a tensile strength of 310-350 MPa, and a hardness of about 85-95 Brinell. However, these values are merely illustrative and exemplary. A skilled artisan can identify materials with desired properties for particular applications.

In these additive friction stir process embodiments, the filler material (for example, solid bar or powder) can be fed through the rotating additive friction stir tool where frictional and adiabatic heating occurs at the filler/substrate interface due to the rotational motion of the filler and the downward force applied. The frictional and adiabatic heating that occurs at the interface results in a severe plastic deformation at the tool-metal interface. In embodiments, as the friction stir tool moves along the along a vector overlying the grooves (or with any relative motion between the substrate and tool), the plasticized metal from the filler material and/or second substrate can be extruded under the rotating shoulder of the tool into the grooves of the first substrate. In embodiments, the rotating additive friction stir tool can contact the grooved surface of the first substrate directly to deposit the filler/substrate into the groove directly and deform the groove, thereby locking the deposited material into the grooves.

The filler material may be of a similar or dissimilar material as that of the first substrate and/or second substrate materials. In a particular embodiment, the filler material is a metallic material. Non-limiting examples of metallic materials useful as a filler material include steel, Al, Ni, Cr, Cu, Co, Au, Ag, Mg, Cd, Pb, Pt, Ti, Zn, Fe, Nb, Ta, Mo, W, as well as alloys of two or more of these metals and the like.

In another embodiment, the filler material is a polymeric material. Non-limiting examples of polymeric materials useful as a filler material include polyolefins, polyesters, nylons, vinyls, polyvinyls, acrylics, polyacrylics, polycarbonates, polystyrenes, polyurethanes, and the like. In still yet another embodiment, the filler material is a composite material comprising at least one metallic material and at least one polymeric material. In other embodiments, multiple material combinations may be used for producing a composite at the interface.

In one embodiment, the filler material is the same as the second substrate. The filler material may be deposited on top of a sheet material comprising the second substrate as in the first embodiment or may be deposited directly from the tool on top of the first substrate as in the second embodiment.

The filler materials can be in several forms, including but not limited to: 1) metal powder or rod of a single composition; 2) matrix metal and reinforcement powders can be mixed and used as feed material; or 3) a solid rod of matrix can be bored (e.g., to create a tube or other hollow cylinder type structure) and filled with reinforcement powder, or mixtures of metal matric composite and reinforcement material. In the latter, mixing of the matrix and reinforcement can occur further during the fabrication process. In embodiments, the filler material may be a solid metal rod. In one embodiment, the filler material is aluminum.

In embodiments, the filler material is joined with a substrate using frictional heating and compressive loading of the filler material against the substrate and a translation of the rotating friction tool. The filler material may be a consumable material, meaning as frictional heating and compressive loading are applied during the process, the filler material is consumed from its original form and is applied to the substrate. Such consumable materials can be in any form including powders, pellets, rods, and powdered-filled cylinders, to name a few. As the applied load is increased, the filler material and substrate at the tool-substrate interface become malleable as a result of frictional and adiabatic heating and are caused to bond together under the compressive load. In a first embodiment, the deformed metal is then extruded into the grooves of the first substrate below the second substrate. In a second embodiment, the tool touches the groove pattern directly and deposits the filler material into the grooves.

The rotating additive friction stir tool may take a variety of forms. For example, the tool can be configured as described in any of U.S. Published Application Nos. 2008/0041921, 2010/0285207, 2012/0009339, and 2012/0279441, 2012/0279442, as well as International Patent Application Publication No. WO2013/002869. Friction-based fabrication tooling for performing methods of the invention are preferably designed or configured to allow for a filler material to be fed through or otherwise disposed through an internal portion of a non-consumable member, which may be referred to as a throat, neck, center, interior, or through hole disposed through opposing ends of the tool. This region of the tool can be configured with a non-circular through-hole shape. Various interior geometries for the tooling are possible. With a non-circular geometry, the filler material is compelled or caused to rotate at the same angular velocity as the non-consumable portion of the tool due to normal forces being exerted by the tool at the surface of the tool throat against the feedstock. Such geometries may include a square through-hole and an elliptical through-hole as examples. In configurations where only tangential forces can be expected to be exerted on the surface of the filler material by the internal surface of the throat of the tool, the feed stock will not be caused to rotate at the same angular velocity as the tool. Such an embodiment may include a circular geometry for the cross-section of the tool in combination with detached or loosely attached feedstock, which would be expected to result in the filler material and tool rotating at different velocities. As used in this disclosure, the terms "additive friction-stir tool", "friction-stir tool", "non-consumable friction-stir tool", and "rotating non-consumable friction-stir tool" may be used interchangeably.

In embodiments the throat of the tool may be shaped with a non-circular cross-sectional shape. Further desired are tooling wherein the throat of the tool is shaped to exert normal forces on a solid, powder, or powder-filled tube type filler material disposed therein. Embodiments may also include features to ensure the frictional heating and compressive loading are of a degree sufficient to enable mixing of dispensed filler material with material of the substrate at a filler-substrate interface.

More specifically, the magnitude of force transferred from the rotating tool to the filler material is dependent on the coefficient of friction between the two. Thus, if the coefficient of friction is significantly low and the inertial force required to induce rotation of the filler material is significantly high, then the tool can rotate without inducing rotation (or with inducing rotation at a lower speed than the tool) in the cylindrical filler material. Under some circumstances during operation, differences in rotational velocity between the tool and the filler within the tool can lead to some filler material being deposited inside the tool, an accumulation of which can be problematic. Having the specific interior tool geometries described in this disclosure can reduce this issue, such as appropriately sized square-square or elliptical-elliptical shaped filler-dispenser geometries. Another way of reducing the difference in rotational velocity between the tool and the filler material is to manufacture filler material rods to fit tightly within the throat of the tool, or to otherwise tightly pack the filler material into the throat of the tool.

Any shape of the cross section of the interior of the tool that is capable of exerting normal forces on a filler material within the tool can be used. The throat surface geometry and the filler material geometry can be configured to provide for engagement and disengagement of the tool and filler material, interlocking of the tool and feed material, attachment of the tool and feed material, whether temporary or permanent, or any configuration that allows for the filler material to dependently rotate with the tool.

The interior surface shape of the tool (the throat) and the corresponding shape of the filler material may not be critical and can be constructed in a manner suitable for a particular application. Shapes of these surfaces can include, but are by no means limited to, square, rectangular, elliptical, oval, triangular, or typically any non-circular polygon. Additional shapes may include more distinctive shapes such as a star, daisy, key and key-hole, diamond, to name a few. Indeed, the shape of the outside surface of the filler material need not be the same type of shape as the surface of the throat of the tool. For example, there may be advantages from having a filler material rod with a square cross-section for insertion into a tool throat having a rectangular cross-section, or vice-versa where a filler material rod having a rectangular cross-section could be placed within a tool throat having a square cross-section in which the corners of the filler material rod could contact the sides of the square throat instead of sides contacting sides. Particular applications may call for more or less forces to be exerted on the filler material within the throat during operation of the tool. With concentric shapes and very close tolerance between the filler material and the tool certain advantages may be realized. Additionally, different shapes may be more suitable for different applications or may be highly desired due to their ease of manufacturing both the interior of the tool and corresponding filler material rods. One of ordinary skill in the art, with the benefit of this disclosure, would know the appropriate shapes to use for a particular application.

Additional embodiments of additive friction stir tools according to the invention include a tool with one or more pins or projections. The one or more pins may be used to penetrate into the substrate during the metal joining process. However, in other embodiments, the additive friction stir tool has no pin capable of penetrating into the substrate.

Additional embodiments of additive friction stir tools according to the invention can include a tool with a throat, where the filler material and throat are operably configured to provide for continuous feeding of the filler material through the throat of the stirring tool. In embodiments, the filler material is a powder, the throat of the tool is a hollow cylinder, and an auger shaped member disposed within the throat of the tool is used to force powder material through the throat of the tool onto the substrate. The filler material can be delivered by pulling or pushing the filler material through the throat of the stirring tool.

Additional embodiments can comprise an additive friction stir tool comprising: a non-consumable body formed from material capable of resisting deformation when subject to frictional heating and compressive loading; a throat with an internal shape defining a passageway lengthwise through the non-consumable body; an auger disposed within the tool throat with means for rotating the auger at a different velocity than the tool and for pushing powdered filler material through the tool throat; whereby the non-consumable body is operably configured for imposing frictional and adiabatic heating and compressive loading of the filler material against a substrate resulting in plasticizing of the filler material and substrate.

In embodiments, the tool and auger preferably rotate relative to the substrate. In further embodiments, the tool and auger rotate relative to one another, i.e., there is a difference in rotational velocity between the auger and the tool body. There may be some relative rotation between the filler material and the substrate, tool, or auger. The filler material and tool are preferably not attached to one another to allow for continuous or semi-continuous feeding or deposition of the filler material through the throat of the tool.

For example, the filler material to be joined with the substrate may be applied to the substrate surface using a "push" method, where a rotating-plunging tool, e.g., auger, pushes the filler material through the rotating tool, such as a spindle. Feed material can be introduced to the tool in various ways, including by providing an infinite amount of filler material into the tool body from a refillable container in operable communication with the tool.

In embodiments, the filler material is a powdered solid and is fed through the tool body using an auger shaped plunging tool (e.g., a threaded member). In such an embodiment, the plunging tool may or may not be designed to move or "plunge" in a direction toward the substrate. For example, the threaded configuration of the auger itself is capable of providing sufficient force on the powdered feed material to direct the filler material toward the substrate for deposition, without needing vertical movement of the auger relative to the tool.

As the spindle and plunging tool rotate, compressive loading and frictional heating of the filler material can be performed by pressing the filler material into the substrate surface with the downward force (force toward substrate) and rotating speed of the additive friction stir tool.

During the metal joining process, it is preferred that the spindle rotate at a slightly slower rate than the auger. Alternatively, in embodiments, the spindle can also be caused to rotate faster than the auger. What is important in embodiments is that there is relative rotation between the spindle and the auger during application of the filler material. Due to the difference in rotational velocities, the threaded portion of the auger provides means for pushing the filler material through the tool body to force the material out of the tool toward the substrate. The threads impart a force on the feedstock that pushes the feed material toward the substrate much like a linear actuator or pneumatic cylinder or other mechanical force pushing on a surface of the feedstock. Even further, it may be desired in some applications to alter the rotational velocity of the tool body and/or auger during deposition of the filler material.

Deposition rate of the filler material on the substrate can be adjusted by varying parameters such as the difference in rotational velocity between the auger screw and the spindle, or modifying the pitch of the threads on the auger. If desired, for particular applications it may be warranted to control filler material temperature inside or outside of the tool body. Such thermally induced softening of the filler material provides means to increase the rate of application of the material.

In the context of this specification, the terms "filler material," "consumable material," "feed material," "feedstock" and the like may be used interchangeably to refer to the material that is applied to the substrate from the additive friction fabrication tooling. In an embodiment, a powder filler material is used in combination with an auger disposed in the tool throat for applying a constant displacement to the filler material within the throat.

The filler material (for example, powder or solid feedstock) can be fed through the rotating spindle where frictional heating occurs at the filler/substrate interface due to the rotational motion of the filler and the downward force applied. The frictional and adiabatic heating that occurs at the interface acts to plasticize the substrate and filler material at the interface resulting in a metallurgical bond between the substrate and filler.

Figure 3:
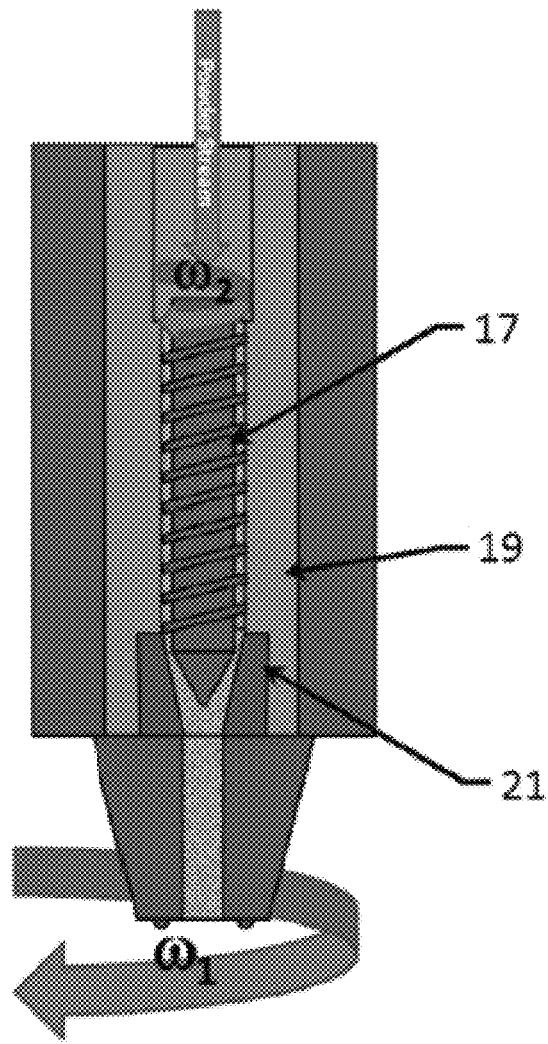
FIG. 3 is a schematic diagram showing a continuous feeding system for use in the invention.

A mechanism as shown in FIG. 3 was conceived to feed powder into the spindle and force it out of the spindle while ensuring the filler is keyed into the spindle. This system utilizes an auger screw 17 to force powder through the spindle at a defined rate, which is one means capable of accomplishing this purpose. Additional methods of feeding solid stock keyed into the orientation of the spindle and rotating at the exact rate of the spindle are conceivable. For example, force can be applied to the filler material using a metal rolling mill type mechanism which is rotating with the spindle.

In such an embodiment, the spindle is spinning at a desired rotational velocity and the auger screw is driven at a different rotational speed in the same rotational direction which acts to force material out of the spindle. As shown in FIG. 3, the angular rotational speed or velocity of the friction stir tool is identified as $\omega 1$ and the angular rotational velocity of the auger is identified as $\omega 2$. In the context of this specification, the terms "rotational speed," "rotational velocity," "angular speed," and "angular velocity" can be used interchangeably and refer to the angular velocity of a component of the tool during use. The auger screw can rotate at a slower speed than the spindle, or in preferred embodiments the auger screw can rotate faster than the spindle.

What is important is that there is relative rotation between the spindle and auger to cause filler material to be forced through the throat of the tool.

The pitch of the threaded auger screw and the volumetric pitch rate of the screw will affect the deposition rate under certain circumstances, and can be modified to accomplish particular goals. It is within the skill of the art to modify the pitch of the threads on the auger to obtain a certain desired result. The terms "tool," "friction stir tool," "spindle," "tool body," and the like as used in this specification may be used to refer to the outer portion of the tool body, which comprises a passageway lengthwise through the tool for holding and dispensing feed material through the tool. This passageway, or throat, is generally the shape of a hollow cylinder. The hollow cylinder can be configured to have a wider opening at the top of the tool for accommodating the auger and powder material and a smaller opening at the base of the tool where the feed material is dispensed from the tool. Thus, the shape of the throat of the tool need not be consistent throughout the length of the tool throat and can be configured to converge from one lengthwise end of the tool to the other. As shown in FIG. 3, the throat of the tool can comprise a first region which is the shape of a hollow cylinder of a first diameter. This region can transition into a second region which is the shape of a hollow cylinder of a second smaller diameter. The transition region can be a converging hollow cylinder or funnel shaped region to allow the first and second region to be connected seamlessly.

Disposed within the tool body is an auger 17. In the context of this specification, the terms "auger," "screw," and "plunger" may be used to refer to a component of the tool that is disposed within the tool throat for pushing or pulling material through the throat. Also within this specification, the auger can be considered a component of the friction stir tool body. The auger can have the general shape of a screw with threads, as shown in FIG. 3, or can be shaped in a spiral configuration similar to a spring. When disposed within the tool throat, there may be clearance between the auger 17 and the inside surface of the tool throat to allow for the passage of feed material between the auger and the throat. The inside of the surface of the tool throat includes sleeve 19 and bore 21. In other embodiments, there is only enough space to allow for rotation of the auger without interference from the surface of the throat. Preferably, the auger and tool body or spindle are not attached to one another. Each is operably connected with means for rotating and translating the components relative to a substrate surface, such that the auger and tool can rotate at different speeds but translate relative to the substrate at the same speed. It is preferred to keep the auger disposed within the tool throat in a manner such that there is no relative translational movement between the auger and tool body.

Powdered materials can be fed into the top of the spindle using a fluidized powder delivery system. Any type of powder delivery system can be used in connection with the tools and systems of the present invention. For example, a gravity-fed powder feeder system can be used, such as a hopper. One such feed system is the Palmer P-Series Volumetric Powder Feeder from Palmer Manufacturing of Springfield Ohio, which is capable of delivering feed material from 0.1-140 cu. ft. per hour, and which comprises a flexible polyurethane hopper, stainless steel massaging paddles, 304 stainless steel feed tube and auger, 90-volt DC gearhead drive motor, flexible roller chain drive system, sealed drive train and cabinet, and solid state control and pushbutton controls. The feed system preferably comprises a reservoir for holding powder filler material, a mixer for mixing powder(s) added to the reservoir, and a passageway for delivering feed material from the hopper to the throat of the tool body. As feed material is dispensed into and from the tool, more feed material is delivered into the tool from the hopper. In this manner, the feed material is continuously or semi-continuously delivered. The gravity-fed dispensing systems allow for feed material to automatically be dispensed from the hopper to the friction stir tool during use as soon as material within the tool is dispensed.

In embodiments, a mix of powder types can be added to the hopper which is operably connected with the stir tool. Alternatively, several different types of powder can be added individually to the hopper, then mixed within the hopper and dispensed as a mixture to the friction stir tool during use. For example a metal powder and ceramic powder could be fed into the spindle at the same time, from the same or separate hoppers, and upon consolidation/deposition the filler would be a metal matrix composite (MMC). As used herein, the term "metal matrix composite" means a material having a continuous metallic phase having another discontinuous phase dispersed therein. The metal matrix may comprise a pure metal, metal alloy or intermetallic. The discontinuous phase may comprise a ceramic such as a carbide, boride, nitride and/or oxide. Some examples of discontinuous ceramic phases include SiC, $TiB_2$ and $Al_2O_3$. The discontinuous phase may also comprise an intermetallic such as various types of aluminides and the like. Titanium aluminides such as TiAl and nickel aluminides such as $Ni_3Al$ may be provided as the discontinuous phase. The metal matrix may typically comprise Al, Cu, Ni, Mg, Ti, Fe and the like.

EXAMPLE

Figure 4:
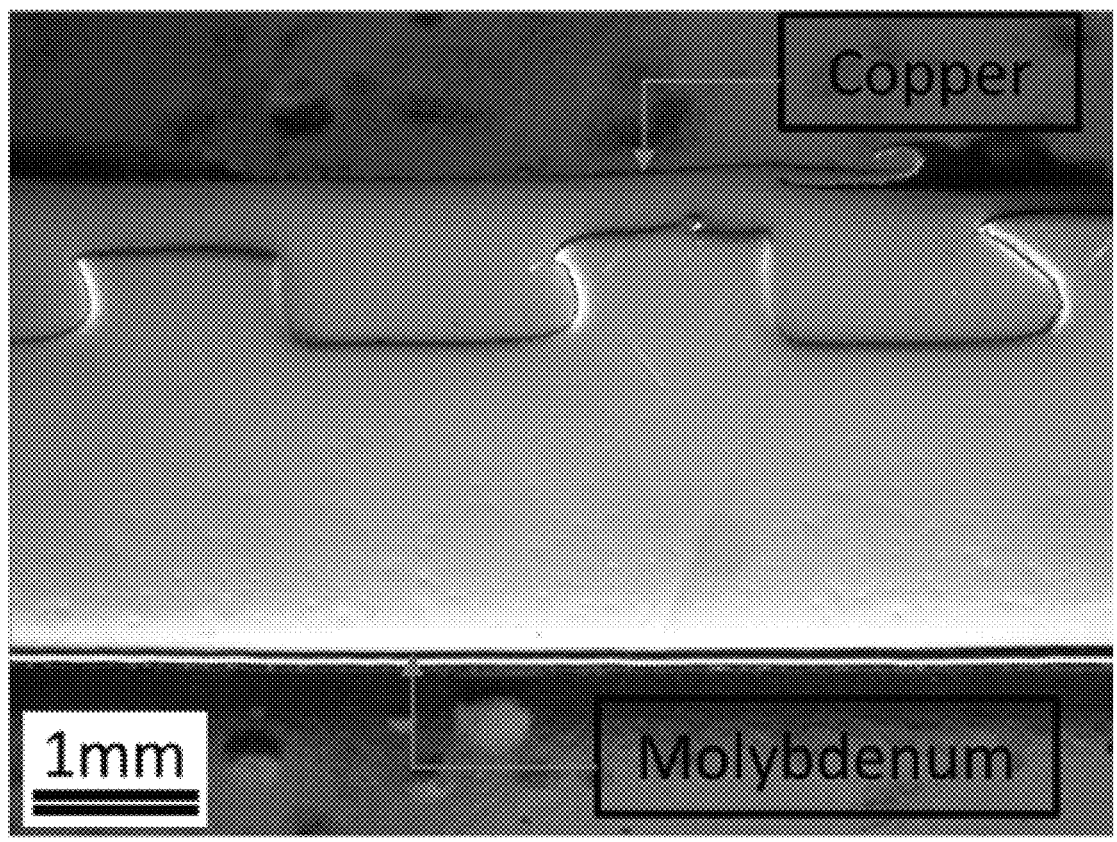
FIG. 4 is a macrograph image showing a cross section of an article of manufacture comprising two different metals (molybdenum and copper) in an interlocking configuration prepared according to an embodiment of the invention.

FIG. 4 is a macrograph image showing a cross section of an article of manufacture comprising two different metals (molybdenum and copper) in an interlocking configuration prepared according to an embodiment of the invention. The substrate comprises molybdenum and multiple grooves in the surface of the substrate. The cross-sectional shape of the grooves in the substrate is rectangular. Copper was added to the surface of the substrate using an additive friction stir tool. At least one side of the grooves was deformed during the additive friction stir process to provide for a mechanical interlocking configuration between the molybdenum substrate and the copper coating. In the area of the joint between the molybdenum and copper, each of the copper and molybdenum have two-dimensional projections into this area as shown. Some of the two-dimensional projections are of convex polygon shape and some are of concave polygon shape. Other combinations of materials can also be used, including the same material as both the substrate and the coating. Additionally, the following combinations, W—Cu, Ta—Cu, Ti—Al, Fe (steel-Al), Al—Cu, Fe—Mg, Ti—Mg, and Al—Mg, are also possible for example for different substrate and coating material.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. An article of manufacture comprising:
   two metals joined in an interlocking configuration; and
   a metallurgical joint between the two metals along an area of interlocking and a wrought microstructure;
   wherein a cross section of the joint reveals each of the two metals providing a plurality of two-dimensional projections into the area of interlocking;
   wherein at least one of the two-dimensional projections has a base and two sidewalls and the sidewalls are asymmetric to one another.

2. The article of manufacture of claim 1, wherein the two metals are different from one another.

3. The article of manufacture of claim 2, wherein the two metals are each independently chosen from steel, Al, Ni, Cr, Cu, Co, Au, Ag, Mg, Cd, Pb, Pt, Ti, Zn, Fe, Nb, Ta, Mo, W, or an alloy comprising one or more of these metals.

4. The article of manufacture of claim 1, wherein at least one of the two-dimensional projections has one sidewall which is curvilinear.

5. The article of manufacture of claim 1, wherein the sidewalls have a geometry that varies along the length of the joint.

6. The article of manufacture of claim 1, wherein at least one of the two-dimensional projections is concave polygon-shaped.

7. The article of manufacture of claim 1, wherein the cross-section of the joint reveals that the plurality of two-dimensional projections is arranged in a row.

8. The article of manufacture of claim 7, wherein the two metals are different from one another and the plurality of two-dimensional projections alternate between a first metal adjacent to a second metal.

9. The article of manufacture of claim 7, wherein the two metals are the same metal and the plurality of two-dimensional projections alternate between a first metal adjacent to a second metal.

10. The article of manufacture of claim 1, wherein the two metals are each independently chosen from steel, Al, Ni, Cr, Cu, Co, Au, Ag, Mg, Cd, Pb, Pt, Ti, Zn, Fe, Nb, Ta, Mo, W, or an alloy or composite comprising one or more of these metals.

11. The article of manufacture of claim 1, which is a structural component of an automobile, a ship, a tank, a plane, or an aerospace vehicle.

12. The article of manufacture of claim 1, wherein the two metals are the same metal.

13. The article of manufacture of claim 1, wherein the two-dimensional projections have linear sidewalls.

14. The article of manufacture of claim 1, wherein the cross section of the joint reveals a metallurgical bond between the two metals along the entire joint.

15. The article of manufacture of claim 1, wherein the plurality of two-dimensional projections are arranged in any pattern.

16. The article of manufacture of claim 15, wherein the plurality of two-dimensional projections are arranged non-linearly.

17. The article of manufacture of claim 1, wherein the two metals are each independently chosen from metals, metallic materials, metal matrix composites (MMCs), steel, Al, Ni, Cr, Cu, Co, Au, Ag, Mg, Cd, Pb, Pt, Ti, Zn, Fe, Nb, Ta, Mo, W, or an alloy comprising one or more of these metals, as well as combinations of any of these materials.

18. An article of manufacture comprising:
   a substrate with a surface comprising a plurality of grooves;
   a layer of material joined to the substrate along a joint;
   wherein the layer of material joined to the substrate has at least one two-dimensional projection extending into at least one of the plurality of grooves;
   wherein the at least one two-dimensional projection and the at least one groove are provided in an interlocking configuration and a cross section of an area of the interlocking configuration reveals plastic deformation of both the layer of material and the substrate and that the plastic deformation is a result of the layer of material being joined to the substrate by way of an additive-type fabrication process;
   wherein each the at least one two-dimensional projection completely fills the at least one groove.

19. The article of manufacture of claim 18, wherein a cross-section of the joint reveals that at least one of the two-dimensional projections is concave polygon-shaped.

20. The article of manufacture of claim 18, wherein a cross-section of the joint reveals that at least one of the two-dimensional projections has one sidewall which is curvilinear.

21. The article of manufacture of claim 18, wherein sidewall geometry of the at least one groove varies along the length of the joint.

22. The article of manufacture of claim 18, wherein a cross-section of the joint reveals that at least one of the two-dimensional projections has two sidewalls which are asymmetric to one another.

23. The article of manufacture of claim 18, wherein the substrate and the layer of material joined to the substrate comprise materials each independently chosen from metals, metallic materials, metal matrix composites (MMCs), polymers, polymeric materials, ceramics, ceramic materials, steel, Al, Ni, Cr, Cu, Co, Au, Ag, Mg, Cd, Pb, Pt, Ti, Zn, Fe, Nb, Ta, Mo, W, or an alloy comprising one or more of these metals, as well as combinations of any of these materials.

24. The article of manufacture of claim 18, wherein the substrate and the layer of material joined to the substrate are each a metal matrix composite comprising a metal matrix and a ceramic phase, wherein the metal matrix comprises one or more of a metal, a metal alloy, or an intermetallic and the ceramic phase comprises a ceramic.

25. The article of manufacture of claim 18, wherein the substrate and the layer of material joined to the substrate comprise different materials.

26. The article of manufacture of claim 18, wherein the two-dimensional projections are linear.

27. The article of manufacture of claim 18, wherein a cross-section of the joint reveals that at least one of the two-dimensional projections has two sidewalls which are symmetric to one another.

28. An article of manufacture comprising:
a first and second metal joined together along a region of interlocking;
wherein a cross section of the region of interlocking reveals a plurality of two-dimensional projections of the first metal and a plurality of two-dimensional projections of the second metal;
wherein the plurality of two-dimensional projections comprise sidewalls with varying geometry; and
wherein the cross section of the region of interlocking reveals a metallurgical bond between the first and second metal and a wrought microstructure.

29. An article of manufacture comprising:
two metals joined in an interlocking configuration; and
a joint between the two metals along an area of interlocking;
wherein the joint comprises a partial mechanical and metallurgical joint between the two metals and a wrought microstructure;
wherein a cross section of the joint reveals each of the two metals providing a plurality of two-dimensional projections into the area of interlocking; and
wherein at least one of the two-dimensional projections has a base and two sidewalls and the sidewalls are symmetric to one another.

* * * * *